United States Patent
Ikeda et al.

[11] Patent Number: 5,870,269
[45] Date of Patent: Feb. 9, 1999

[54] DEMAGNETIZING CIRCUIT

[75] Inventors: Yutaka Ikeda, Youkaichi; Yuichi Takaoka, Gamou-gun; Kiyofumi Torii, Ohmihachiman, all of Japan

[73] Assignee: Murata Mfg. Co., Ltd., Kyoto, Japan

[21] Appl. No.: 635,267

[22] Filed: Apr. 19, 1996

[30] Foreign Application Priority Data

Apr. 20, 1995 [JP] Japan .................................... 7-095117

[51] Int. Cl.⁶ ...................................................... H01F 13/00
[52] U.S. Cl. ............................................ 361/149; 361/267
[58] Field of Search ................................. 361/149–151, 361/267, 54, 106; 315/8

[56] References Cited

U.S. PATENT DOCUMENTS

| 4,164,775 | 8/1979 | Slegers | 361/150 |
| 4,445,072 | 4/1984 | Fredres | 361/150 |

FOREIGN PATENT DOCUMENTS

| 52-28112 | 6/1977 | Japan . |
| 52-28113 | 6/1977 | Japan . |

*Primary Examiner*—Sally C. Medley
*Attorney, Agent, or Firm*—Ostrolenk, Faber, Gerb & Soffen, LLP

[57] ABSTRACT

A demagnetizing circuit has a positive characteristic thermistor and a demagnetizing coil connected in series with an alternating current power supply and is so constructed that it is possible to suppress the production of a low-frequency electromagnetic field. After the completion of a demagnetizing operation, the demagnetizing coil and the alternating current power supply can be completely isolated from each other, i.e. both ends of the demagnetizing coil can be electrically cut off from the alternating current power supply, so that it is impossible for residual demagnetizing current from the alternating current power supply to produce a low-frequency electromagnetic field in the demagnetizing coil. Also, preferably, at least one end of the demagnetizing coil is kept at a reference potential by way of a capacitor to dissipate any currents which may be induced in the demagnetizing coil by any influence other than the alternating current power supply.

11 Claims, 3 Drawing Sheets

DEMAGNETIZING CIRCUIT

BACKGROUND OF THE INVENTION

This invention relates to a demagnetizing circuit, and particularly to a circuit construction of a demagnetizing circuit.

Conventionally, among demagnetizing circuits built into shadow mask type cathode ray tubes of color television receivers and the like, there have been those of the kind disclosed in Japanese Utility Model Publication No. S.52-28112 and Japanese Utility Model Publication No. S.52-28113. These demagnetizing circuits have the kind of circuit construction shown in simplified form in FIG. 7. The conventional demagnetizing circuit shown in FIG. 7 comprises a positive temperature characteristic thermistor (hereinafter called a PTC) 3 and a demagnetizing coil 4 connected in series with an alternating current power supply 2 by way of a power supply switch 1. A thermally actuated changeover switch 5 such as a bimetal switch opened/closed by heat produced by the PTC 3 is connected in parallel with the demagnetizing coil 4.

In a modified version of this circuit construction, the thermally actuated changeover switch 5 is connected in series between the PTC 3 and the demagnetizing coil 4 and a bypass resistor 6 is connected in parallel with the demagnetizing coil 4 as shown in FIG. 8.

In the conventional circuit construction shown in FIG. 7, when the power supply switch 1 is closed, current from the power supply 2 flows through the PTC 3 and the demagnetizing coil 4, demagnetizing a shadow mask plate of a cathode ray tube, and the PTC 3 produces heat. As time passes the resistance of the PTC 3 rapidly rises and the current flowing through the demagnetizing coil 4 falls, and the current flowing through the demagnetizing coil 4 is thereby controlled according to the resistance-temperature characteristic of the PTC 3. Also, heat produced by the PTC 3 is transmitted to the changeover switch 5, which had been open. When the changeover switch 5 is heated by the PTC 3, it consequently closes and as a result current from the power supply 2 flows through the changeover switch 5 and the flow of current through the demagnetizing coil 4 is cut off.

In the modified example shown in FIG. 8, on the other hand, the changeover switch 5, which is connected in series between the PTC 3 and the demagnetizing coil 4 and had been closed, is opened by heat produced by the PTC 3. Current from the power supply 2 consequently flows through the bypass resistor 6 and as a result, as in the example shown in FIG. 7, the current flowing from the power supply 2 to the demagnetizing coil 4 is cut off.

Demagnetizing circuits having the circuit constructions of the conventional examples of FIGS. 7 and 8 have the merits that it is possible to automatically cut off residual demagnetizing current that is still flowing after the demagnetization is complete, and to eliminate both picture shake of a cathode ray tube caused by effects of residual demagnetizing current, and picture disturbance caused by intruding noise from the power supply 2.

However, in recent years, due to their connection with the impediment by the VDT and the like, a strong demand has arisen to suppress low-frequency electromagnetic fields produced by cathode ray tubes, and the demagnetizing coil 4 in the demagnetizing circuit has been seen as one source of such low-frequency electromagnetic fields. However, in demagnetizing circuits having the conventional constructions described above, because one side of the power supply 2 and one side of the demagnetizing coil 4 are connected even after the changeover switch 5 operates, there has been the problem that it has been extremely difficult to suppress the production of a low-frequency electromagnetic field.

SUMMARY OF THE INVENTION

The present invention was devised in view of this kind of problem. An object of the invention is to provide a demagnetizing circuit with which it is possible to suppress the production of a low-frequency electromagnetic field.

A demagnetizing circuit according to a broad feature of the invention has a PTC and a demagnetizing coil connected in series with an alternating current power supply. To achieve the above-mentioned object and other objects, the circuit is constructed so that the demagnetizing coil and the alternating current power supply can be cut off from each other, that is, so that both ends of the demagnetizing coil can be electrically cut off from the alternating current power supply.

In a first specific example of the invention, respective changeover switches actuated by heat produced by the PTC are provided on both sides of the demagnetizing coil and the two sides of the alternating current power supply are electrically connected to the demagnetizing coil by way of at least one of the changeover switches.

In a second specific example of the invention, a heat-producing resistor is connected in parallel either between the two sides of the alternating current power supply or between the two sides of the demagnetizing coil, and respective changeover switches actuated by heat produced by the heat-producing resistor are provided on both sides of the demagnetizing coil.

In a third specific example of the invention, respective semiconductor switching elements are provided on both sides of the alternating current power supply, and the two sides of the alternating current power supply are electrically connected to each other by way of the gates of these semiconductor switching elements and another PTC interposed between these gates.

In a fourth specific example of the invention, respective semiconductor switching elements are provided on both sides of the demagnetizing coil and the two sides of the demagnetizing coil are electrically connected to each other by way of the gates of these semiconductor switching elements and a resistor interposed between these gates.

Preferably, at least one end of a demagnetizing coil of a demagnetizing circuit according to the invention is connected by way of a capacitor to a reference potential.

In the above circuits, both ends of the demagnetizing coil are cut off from the alternating current power supply after completion of a demagnetizing operation and the demagnetizing coil is completely isolated from the alternating current power supply. Thus, it is impossible for a low-frequency electromagnetic field to be produced in this demagnetizing coil by the alternating current power supply.

Also, when one end of the demagnetizing coil is connected to a reference potential by way of a capacitor, even if a current is induced in the demagnetizing coil by an influence such as earth's magnetism or magnetism produced by another electronic component, the induced current rapidly dissipates and does not produce a low-frequency electromagnetic field.

Other features and advantages of the present invention will become apparent from the following description of the invention which refers to the accompanying drawings.

DETAILED DESCRIPTION OF EMBODIMENTS OF THE INVENTION

Preferred embodiments of the invention will now be described with reference to the accompanying drawings.

First Preferred Embodiment

Figure 1:
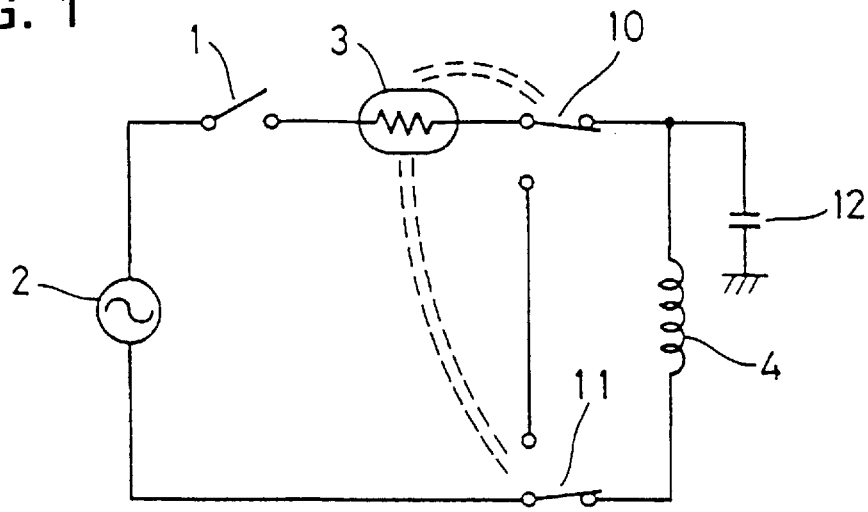
FIG. 1 is a circuit diagram of a demagnetizing circuit according to a first preferred embodiment of the invention.
Figure 2:
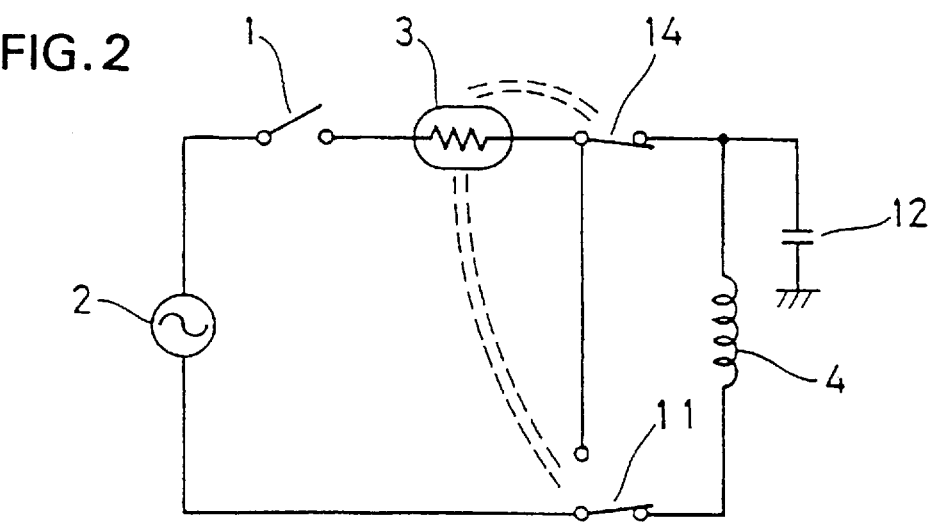
FIG. 2 is a circuit diagram of a demagnetizing circuit according to a modified version of the first preferred embodiment.
Figure 7:
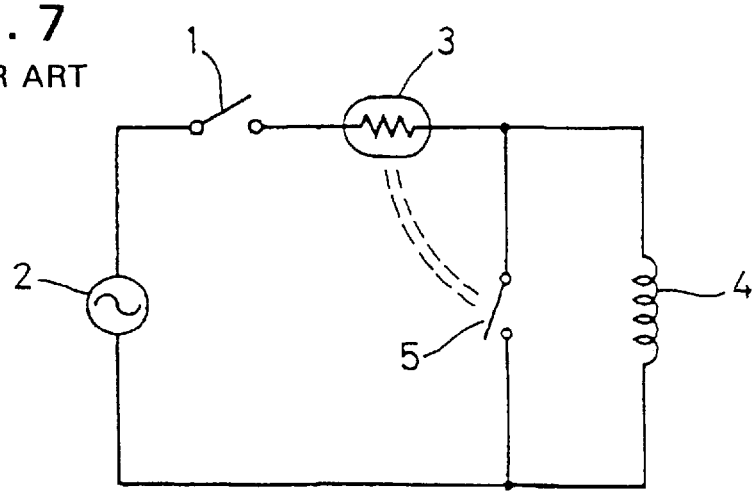
FIG. 7 is a circuit diagram of an example of a conventional demagnetizing circuit.
Figure 8:
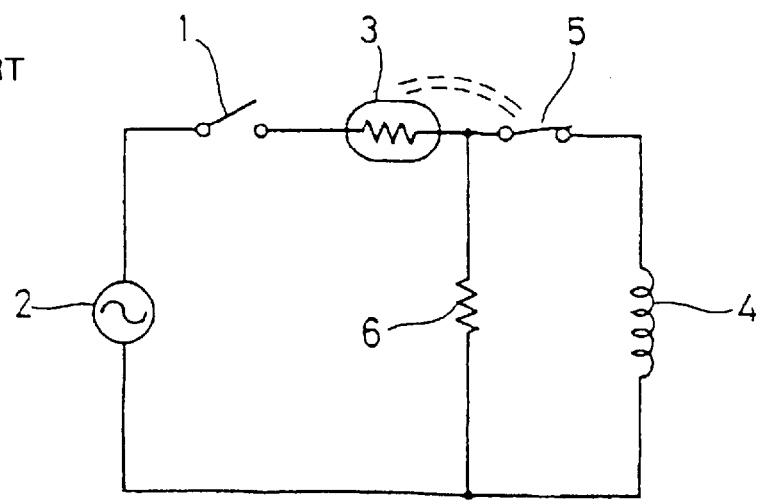
FIG. 8 is a circuit diagram of another example of a conventional demagnetizing circuit.

FIG. 1 is a circuit diagram of a demagnetizing circuit according to a first preferred embodiment of the invention, and FIG. 2 is a circuit diagram of a demagnetizing circuit according to a modified version of the first preferred embodiment. In FIG. 1 and FIG. 2, components and parts that are the same as components and parts shown in FIG. 7 and FIG. 8 have been given the same reference numbers and will not be described here in detail.

As shown in FIG. 1, a demagnetizing circuit according to this preferred embodiment has a PTC 3 and a demagnetizing coil 4 connected in series to an alternating current power supply 2 by way of a power supply switch 1. Thermally actuated changeover switches 10 and 11 which change over between two contact points when the PTC 3 produces heat are provided at both ends of the demagnetizing coil 4. After changing over, the changeover switches 10 and 11 form a closed circuit loop including the alternating current power supply 2 and the PTC 3. That is, the demagnetizing coil 4 in this demagnetizing circuit can be cut off from the alternating current power supply 2 by using the changeover switches 10 and 11. Also, one end of the demagnetizing coil 4 is kept at a reference potential by being chassis grounded by way of a capacitor 12. Of course, both ends of the demagnetizing coil 4 may be kept at a reference potential. Also, a resistor (not shown in the drawings) may be provided in wiring between the changeover switches 10 and 11 and in parallel with the demagnetizing coil 4.

In the circuit construction of this preferred embodiment, when the power supply switch 1 is closed, current from the alternating current power supply 2 flows through the PTC 3, the demagnetizing coil 4 and the unswitched changeover switches 10 and 11, a shadow mask plate of a cathode ray tube is demagnetized by the demagnetizing coil 4, and at the same time the PTC 3 produces heat. When as time passes the resistance of the PTC 3 rapidly increases, the current flowing through the PTC 3 decreases and falls, and the current flowing through the demagnetizing coil 4 is thereby controlled according to the resistance-temperature characteristic of the PTC 3. Also, heat produced by the PTC 3 at this time is transmitted to the thermally actuated changeover switches 10 and 11, causing the changeover switches 10 and 11 to change over and the above-mentioned closed circuit loop to be formed. As a result, current from the alternating current power supply 2 flows through the changeover switches 10 and 11 and the flow of current through the demagnetizing coil 4 is consequently cut off.

That is, the demagnetizing coil 4 in this first preferred embodiment is completely isolated from the alternating current power supply 2 by the switched changeover switches 10 and 11 and it is impossible for the alternating current power source 2 to produce a low-frequency electromagnetic field in the demagnetizing coil 4 thus isolated from the alternating current power supply 2. Also, in this preferred embodiment, because one end of the demagnetizing coil 4 is chassis grounded by way of the capacitor 12, even if a current is induced in the demagnetizing coil 4 by an influence such as earth's magnetism or magnetism produced by another electronic component, this current induced in the demagnetizing coil 4 rapidly dissipates and no low-frequency electromagnetic field is produced.

Although in this preferred embodiment both of the changeover switches 10 and 11 are thermally actuated, the invention is not limited to this feature. For example, one changeover switch may be a thermally actuated switch and the other changeover switch may be a non-thermally-actuated switch actuated by a linkage with the thermally actuated switch. As another example, a separate thermally actuated member (not shown in the drawings) actuated by heat produced by the PTC 3 may be provided and both of the changeover switches 10 and 11 may be switched by a linkage with this thermally actuated member.

Also, although in this preferred embodiment, double-throw thermally actuated changeover switches 10 and 11 are provided on both sides of the demagnetizing coil 4, in the modified version of FIG. 2 a single-throw thermally actuated changeover switch 14 which just opens and closes may be provided at one end of the demagnetizing coil 4 and a double-throw thermally actuated changeover switch 11 which changes over between two contact points may be provided at the other end of the demagnetizing coil 4 so that a closed circuit loop is formed by the alternating current power supply 2, the PTC 3 and the switched changeover switch 11. This kind of circuit construction has the merit that demagnetizing can be carried out with fewer contact points in the circuit as a result of the single-throw type changeover switch 14 being used instead of the double-throw type changeover switch 10, and the two sides of the alternating current power supply 2 are connected by way of the changeover switch 11.

Second Preferred Embodiment

Figure 3:
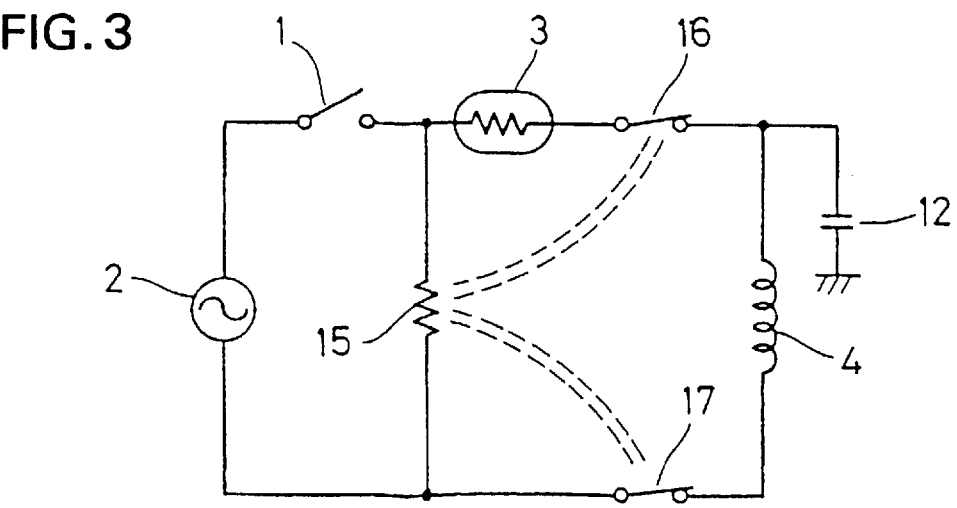
FIG. 3 is a circuit diagram of a demagnetizing circuit according to a second preferred embodiment of the invention.
Figure 4:
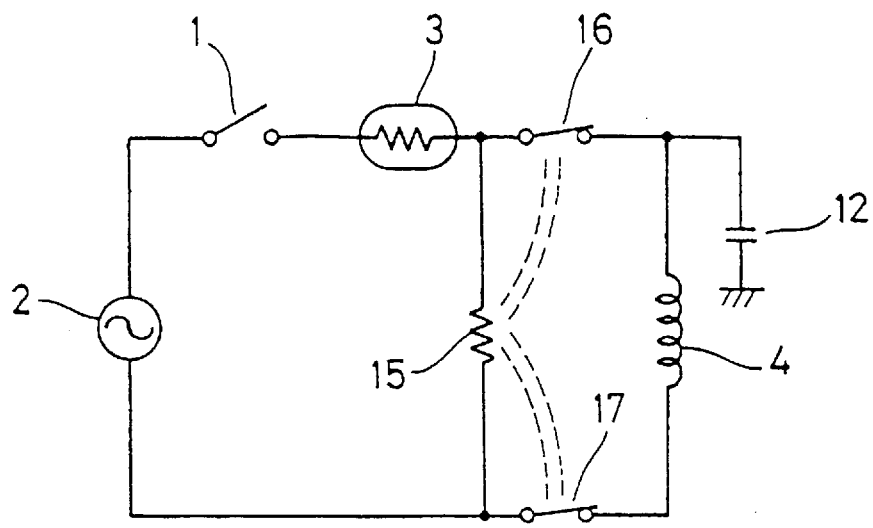
FIG. 4 is a circuit diagram of a demagnetizing circuit according to a modified version of the second preferred embodiment.

FIG. 3 is a circuit diagram of a demagnetizing circuit according to a second preferred embodiment of the invention, and FIG. 4 is a circuit diagram of a demagnetizing circuit according to a modified version of the second preferred embodiment. In FIG. 3 and FIG. 4, components and parts that are the same as components and parts in the first preferred embodiment have been given the same reference numbers and will not be described in detail here.

A demagnetizing circuit according to this preferred embodiment, as shown in FIG. 3, has a PTC 3 and a demagnetizing coil 4 connected in series to an alternating current power supply 2 by way of a power supply switch 1 and has a heat-producing resistor 15 connected in parallel with the alternating current power supply 2 by way of the power supply switch 1. Thermally actuated changeover switches 16, 17 are provided on both sides of the demagnetizing coil 4. These thermally actuated changeover switches 16, 17 are actuated to open by heat produced by the heat-producing resistor 15, and after the changeover switches 16, 17 have opened, a closed circuit loop including the alternating current power supply 2 and the heat-producing resistor 15 is formed. That is, the demagnetizing coil 4 in this circuit construction can be cut off from the alternating current power supply 2 by using the changeover switches 16, 17. As in the first embodiment, one end of the demagnetizing coil 4 is chassis grounded by way of a capacitor 12.

In this second preferred embodiment, when the power supply switch 1 is closed, current from the alternating current power supply 2 flows through the PTC 3, the demagnetizing coil 4 and the closed changeover switches 16 and 17 and also flows through the heat-producing resistor 15, and while demagnetizing is carried out by the demagnetizing coil 4, the PTC 3 produces heat. Then, as time passes and the resistance of the PTC 3 rapidly increases, the current flowing through the demagnetizing coil 4 decreases and the current flowing through the demagnetizing coil 4 is thereby controlled according to the resistance-temperature characteristic of the PTC 3.

Also, at this time, the heat-producing resistor 15 connected in parallel with the alternating current power supply 2 also produces heat as current from the alternating current power supply 2 flows through it, and heat produced by the heat-producing resistor 15 is transmitted to the changeover switches 16 and 17. As a result, the changeover switches 16 and 17 which, by being closed, had been connecting the alternating current power supply 2 and the demagnetizing coil 4 together in series, are actuated to open by being heated by the heat-producing resistor 15. Then, the current flowing through the demagnetizing coil 4 is cut off as the changeover switches 16 and 17 open, and current from the alternating current power supply 2 continues to flow only through the heat-producing resistor 15. As a result, the demagnetizing coil 4 at this time is completely isolated from the alternating current power supply 2 by the opened changeover switches 16 and 17. As in the first preferred embodiment it is impossible for the alternating current power supply 2 to produce a low-frequency electromagnetic field in the demagnetizing coil 4 thus isolated from the alternating current power supply 2.

The heat-producing resistor 15 in this preferred embodiment is connected in parallel with the alternating current power supply 2 so that a closed circuit loop including the alternating current power supply 2 and the heat-producing resistor 15 is formed when the changeover switches 16 and 17 open. However, the invention is not limited to this kind of circuit construction. The heat-producing resistor 15 may for example be connected in parallel between the two ends of the demagnetizing coil 4 as shown in FIG. 4 so that a closed circuit loop including the alternating current power supply 2, the PTC 3 and the heat-producing resistor 15 is formed when the changeover switches 16 and 17 open.

Third Preferred Embodiment

Figure 5:
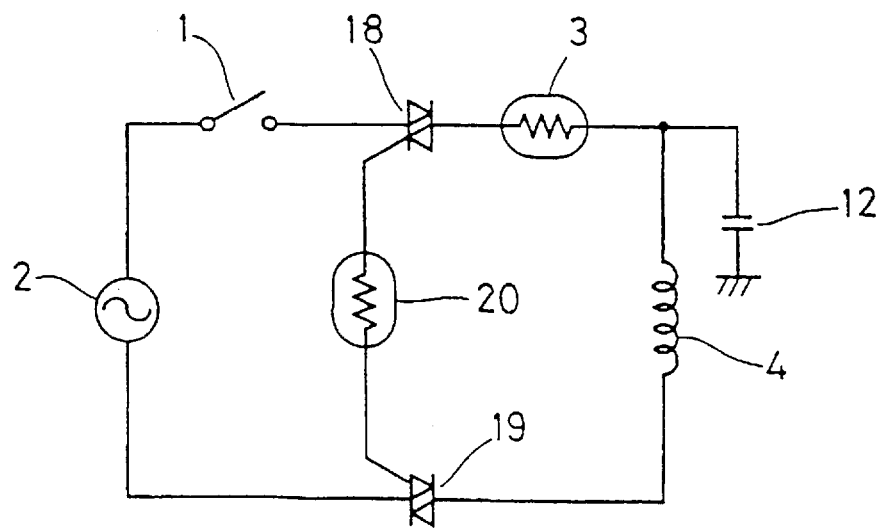
FIG. 5 is a circuit diagram of a demagnetizing circuit according to a third preferred embodiment of the invention.

FIG. 5 is a circuit diagram of a demagnetizing circuit according to a third preferred embodiment of the invention. In FIG. 5, components and parts that are the same as components and parts in FIG. 1 and FIG. 2 have been given the same reference numbers.

A demagnetizing circuit according to this preferred embodiment, as shown in FIG. 5, has a PTC 3 and a demagnetizing coil 4 connected in series with an alternating current power supply 2 by way of a power supply switch 1, and TRIACs 18 and 19, which are semiconductor switching elements, are provided on both sides of the alternating current power supply 2. Another PTC 20, in addition to the PTC 3, is interposed between the gates of the TRIACs 18 and 19, and the gates are thereby electrically connected by way of the PTC 20. That is, the terminals of the TRIACs 18 and 19 in this preferred embodiment connect both sides of the alternating current power supply 2 to both ends of the demagnetizing coil 4 in series, and the demagnetizing coil 4 can be cut off from the alternating current power supply 2 by the TRIACs 18 and 19. In this preferred embodiment also, one end of the demagnetizing coil 4 is chassis grounded by way of a capacitor 12.

When the power supply switch 1 of a demagnetizing circuit according to this preferred embodiment is closed, current from the alternating current power supply 2 flows through the TRIACs 18 and 19 from their terminals on the side of the power supply 2, to their gates. The current flowing through the gates makes the TRIACs 18 and 19 turn ON, and as a result, the terminals on the power supply side of the TRIACs 18 and 19 become continuous with their terminals on the side of the coil 4. Current from the alternating current power supply 2 consequently flows through the demagnetizing coil 4 by way of the PTC 3. Demagnetization is carried out by the demagnetizing coil 4 and heat is produced by the PTC 3. When as time passes the resistance of the PTC 3 rapidly increases, the current flowing through the demagnetizing coil 4 decreases and the current flowing through the demagnetizing coil 4 is thereby controlled according to the resistance-temperature characteristic of the PTC 3.

Also, at this time, heat is also produced in the PTC 20, because the gate current is continuing to pass through it. The resistance of this PTC 20 consequently rapidly increases, and the gate current flowing between the gates of the TRIACs 18 and 19 rapidly decreases. When the gate current decreases, the TRIACs 18 and 19 both go OFF and the flow of current which had been flowing from the alternating current power supply 2 through the PTC 3 to the demagnetizing coil 4 is cut off. As a result, the demagnetizing coil 4 is completely isolated from the alternating current power supply 2 by the TRIACs 18 and 19, and it is impossible for the alternating current power supply 2 to produce a low-frequency electromagnetic field in the demagnetizing coil 4 thus isolated from the alternating current power supply 2.

Fourth Preferred Embodiment

Figure 6:
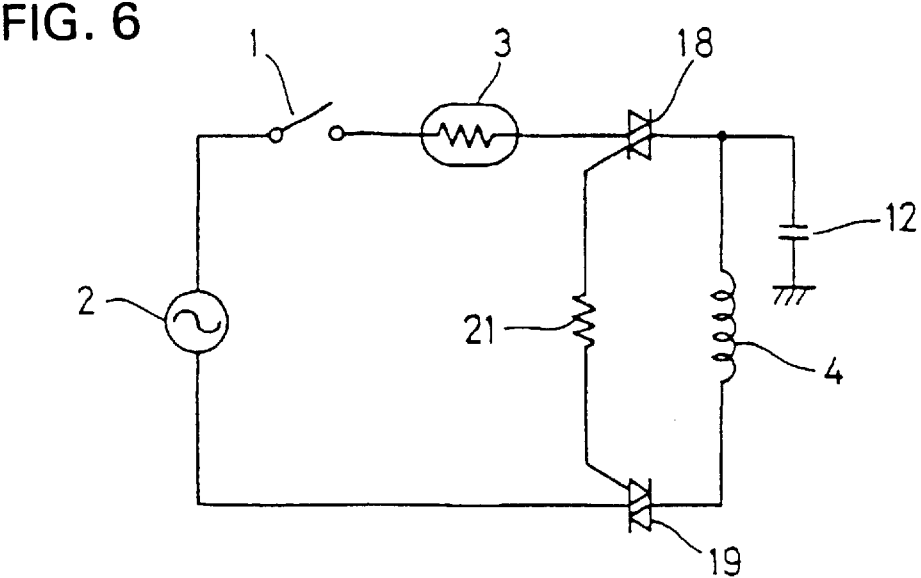
FIG. 6 is a circuit diagram of a demagnetizing circuit according to a fourth preferred embodiment of the invention.

FIG. 6 is a circuit diagram of a demagnetizing circuit according to a fourth preferred embodiment of the invention. In FIG. 6, components and parts that are the same as components and parts in FIG. 1 and FIG. 2 have been given the same reference numbers.

A demagnetizing circuit according to this preferred embodiment, as shown in FIG. 6, has a PTC 3 and a demagnetizing coil 4 connected in series with an alternating current power supply 2 by way of a power supply switch 1, and TRIACs 18 and 19 are provided at both ends of the demagnetizing coil 4. A resistor 21 for setting a suitable gate current is connected between the gates of the TRIACs 18 and 19, whereby the gates are electrically connected by way of the resistor 21. That is, the demagnetizing coil 4 in this preferred embodiment can be cut off from the alternating current power supply 2 by the TRIACs 18 and 19. As in the first preferred embodiment, one end of the demagnetizing coil 4 is chassis grounded by way of a capacitor 12.

When the power supply switch 1 of a demagnetizing circuit according to this preferred embodiment is closed, current from the alternating current power supply 2 flows by way of the PTC 3 from the power supply side terminals of the TRIACs 18 and 19 to the gates thereof, and this gate current causes the TRIACs 18 and 19 to turn ON. Consequently, a current flows from the alternating current power supply 2 through the demagnetizing coil 4 by way of the TRIACs 18 and 19. Demagnetization is carried out by the demagnetizing coil 4 and the PTC 3 produces heat. When as time passes the resistance of the PTC 3 rapidly increases, the current flowing through the demagnetizing coil 4 decreases and the current flowing through the demagnetizing coil 4 is thereby controlled according to the resistance-temperature characteristic of the PTC 3.

Also, at this time, because the current flowing through the demagnetizing circuit decreases, the gate current which had been flowing from the power supply side terminals of the TRIACs 18 and 19 to the gates thereof also decreases. As a result, the TRIACs 18 and 19 go OFF, and the current which had been flowing from the alternating current power supply 2 through the PTC 3 to the demagnetizing coil 4 is cut off. Consequently, the demagnetizing coil 4 is completely isolated from the alternating current power supply 2 by the TRIACs 18 and 19. It is impossible for the alternating current power supply 2 to produce a low-frequency electromagnetic field in the demagnetizing coil 4 thus isolated from the alternating current power supply 2.

As described above, in a demagnetizing circuit having these as features it is possible to cut off both ends of the demagnetizing coil from the alternating current power supply. By cutting off both ends of the demagnetizing coil from the alternating current power supply after completion of the demagnetizing operation, the demagnetizing coil is completely isolated from the alternating current power supply. Consequently, it is impossible for a low-frequency electromagnetic field to be produced in this demagnetizing coil. Therefore, it is possible to automatically cut off residual demagnetizing current after completion of the demagnetizing operation, to eliminate both picture shake of a cathode ray tube caused by effects of residual demagnetizing current and picture disturbance caused by intruding noise from the alternating current power supply, and further, to suppress the production of a low-frequency electromagnetic field.

Also, because at least one end of the demagnetizing coil is kept at a reference potential by way of a capacitor, there is the benefit that even if a current is produced in the demagnetizing coil by an influence such as the earth's magnetism or magnetism produced by another electronic component, after the demagnetizing coil is cut off from the alternating current power supply, this induced current rapidly dissipates and no low-frequency electromagnetic field is produced in the demagnetizing coil.

Although the present invention has been described in relation to particular embodiments thereof, many other variations and modifications and other uses will become apparent to those skilled in the art. Therefore, the present invention is not limited by the specific disclosure herein.

What is claimed is:

1. A demagnetizing circuit comprising a series connection of:

a positive characteristic thermistor, a demagnetizing coil having two ends, an alternating current power supply having two sides, a power supply switch, and a switching arrangement electrically connected at least partly between said power supply switch and said demagnetizing coil, which is operable for disconnecting both ends of said demagnetizing coil from said alternating current power supply.

2. A demagnetizing circuit according to claim 1, wherein said switching arrangement comprises a pair of changeover switches actuated by heat produced by the positive characteristic thermistor which are provided respectively at both ends of the demagnetizing coil, and the alternating current power supply is electrically connected to both of the changeover switches.

3. A demagnetizing circuit according to claim 2, wherein at least one of said changeover switches is a double-throw switch.

4. A demagnetizing circuit according to claim 1, wherein said switching arrangement comprises:

a heat-producing resistor connected in parallel with either the alternating current power supply or the demagnetizing coil; and a pair of changeover switches actuated by heat produced by the heat-producing resistor which are connected respectively to said ends of the demagnetizing coil.

5. A demagnetizing circuit according to claim 4, wherein said heat-producing resistor is connected in parallel with the alternating current power supply.

6. A demagnetizing circuit according to claim 4, wherein said heat-producing resistor is connected in parallel with the demagnetizing coil.

7. A demagnetizing circuit according to claim 1, wherein said switching arrangement comprises a pair of semiconductor switching elements which have gates and which are provided respectively on both sides of the alternating current power supply, and the two sides of the alternating current power supply are electrically connected by way of said gates of the semiconductor switching elements and by a second positive characteristic thermistor connected between said gates.

8. A demagnetizing circuit according to claim 1, said switching arrangement comprises a pair of semiconductor switching elements which have gates and which are provided respectively at both ends of the demagnetizing coil and the two ends of the demagnetizing coil are electrically connected by way of said gates of the semiconductor switching elements and by a resistor connected between said gates.

9. A demagnetizing circuit according to claim 1, wherein at least one end of the demagnetizing coil is connected to a reference potential by way of a capacitor.

10. A demagnetizing circuit according to claim 9, wherein said capacitor connects said at least one end of said demagnetizing coil directly to said reference potential.

11. A demagnetizing circuit comprising a series connection of:

a positive characteristic thermistor, a demagnetizing coil having two ends, an alternating current power supply, and a switching arrangement which is operable for disconnecting both ends of said demagnetizing coil from said alternating current power supply, wherein at least one end of the demagnetizing coil is connected to a reference potential by way of a capacitor, and wherein said capacitor connects said at least one end of said demagnetizing coil directly to said reference potential.

* * * * *